United States Patent [19]
Daniels et al.

[11] Patent Number: 4,507,254
[45] Date of Patent: Mar. 26, 1985

[54] LIGHT REFLECTOR APPARATUS AND METHOD OF MAKING

[75] Inventors: Steven D. Daniels, Churchville; Jeffrey R. Stoneham, Hilton; John K. Erickson, Rochester, all of N.Y.

[73] Assignee: Eastman Kodak Company, Rochester, N.Y.

[21] Appl. No.: 439,478

[22] Filed: Nov. 5, 1982

[51] Int. Cl.³ .............................................. B29D 11/00
[52] U.S. Cl. ...................................... 264/1.9; 362/16; 362/347
[58] Field of Search ...................... 362/13, 14, 16, 341, 362/347, 350; 264/1.9

[56] References Cited

U.S. PATENT DOCUMENTS

| 2,444,532 | 7/1948 | Richardson | 264/1.9 |
| 3,484,597 | 12/1969 | Schmidt | 240/1.3 |
| 3,839,129 | 10/1974 | Neumann | 161/4 |
| 3,991,308 | 11/1976 | Lauter | 362/14 |
| 4,032,769 | 6/1977 | Hartman et al. | 362/13 |
| 4,076,790 | 2/1978 | Lind | 264/266 |
| 4,155,110 | 5/1979 | Armstrong et al. | 362/16 |
| 4,304,479 | 12/1981 | VanAllen | 354/145 |
| 4,317,625 | 3/1982 | VanAllen | 354/145 |

FOREIGN PATENT DOCUMENTS

| 1407876 | 6/1964 | France | 264/266 |
| 2821375 | 11/1978 | France | 264/1.9 |
| 52-45299 | 4/1977 | Japan | 264/1.9 |

Primary Examiner—Peter A. Nelson
Attorney, Agent, or Firm—Dennis P. Monteith

[57] ABSTRACT

Improved light reflector apparatus for use in an electronic flash unit or the like is formed by an injection molding operation, which causes both precise shaping of a reflector and accurate mounting of the reflector securely within a housing. A light-reflecting flexible sheet is placed in a mold so that its light-reflecting front surface is centrally positioned adjacent a mold forming surface. The forming surface, which is larger than the sheet, has a contour adapted for shaping the sheet to reflect light into a beam of illumination. Liquid plastic is injected into the mold under pressure against the opposite surface of the sheet, thus pressing its light-reflecting surface into intimate contact against the forming surface. Because the sheet is smaller, the border of the forming surface is not covered by the sheet. Plastic flows beyond outer edges of the sheet against the uncovered border of the forming surface. The intimate contact between the forming surface and the sheet blocks plastic from leaking therebetween onto the light-reflecting surface. The plastic solidifies to form a housing having a supporting body underlying the sheet and a shoulder, integral with the supporting body and contiguous with and surrounding outer edges of the sheet. The shoulder traps the sheet against the underlying supporting body for maintaining the contour of the sheet caused by the molding surface.

6 Claims, 10 Drawing Figures

LIGHT REFLECTOR APPARATUS AND METHOD OF MAKING

FIELD OF THE INVENTION

The invention relates to an improvement in the method of manufacturing of a light reflector apparatus for use in an electronic flash unit or the like, and to improved light reflector apparatus.

DESCRIPTION RELEVANT TO THE PRIOR ART

Photographic flash apparatus includes a reflector, a source of light, such as a flash bulb or flash tube, and a housing for mounting the light source and the reflector relative to each other.

The flash apparatus produces a beam of illumination, which includes direct illumination from the light source, as well as source illumination reflected from the reflector. In photographic flash apparatus, it is commonly intended that the projected light should, as well as possible, be uniformly distributed within an imaginary plane located a particular distance from the flash apparatus. However, in some photographic flash apparatus, non-uniform light patterns may be desirable, as disclosed in U.S. Pat. No. 4,304,479. Regardless of the desired light distribution, it is important that the reflector be accurately shaped to provide the desired light distribution, and that both the reflector and the light source are accurately mounted within the flash housing and thus, are accurately mounted with respect to each other, to prevent skewing of the projected light beam.

It is known in the photographic flash reflector art to make flash reflector apparatus by vacuum depositing aluminum, which serves as the reflector, directly onto plastic, which forms at least a portion of the flash housing assembly. In order to have a high reflectivity surface, the aluminum coating is made very thin—about 0.05 to 0.075 millimeter. However, with an electronic flash unit it has been found that when the flash tube is located against the reflector and/or a high-energy flash tube is employed, heat from the tube can burn a thin reflector. Also, because there is intimate contact between the reflector and plastic, the latter is also heated and can separate from the reflector. This can both change the shape of the reflector, and/or shift the position of the reflector relative to the flash tube, thus creating errors in both light distribution and direction of the projected light beam.

Heating of the reflector and the plastic is not as severe if the aluminum is made thicker. However, it is not practical in a flash reflector application to vacuum deposit a thicker coating of aluminum because the reflectivity of vacuum-deposited aluminum decreases in proportion to its thickness. Furthermore, a thicker coating increases manufacturing time.

An alternative solution has been to adhesively attach an aluminum coated sticker directly onto a plastic housing. Two advantages achieved with this operation are (1) the sticker and aluminum coating form a thicker reflector, which is, thus, better able to resist burning and to thermally shield the plastic, and (2) the adhesive for securing the sticker serves as a thermal insulator, which further shields the plastic. However, this solution adds to reflector manufacturing costs, and further complicates the manufacturing process, in part, because precise sticker alignment tolerances must be met.

It is also known in the photographic flash reflector art to pre-shape a highly polished aluminum sheet into a reflector. The pre-shaped reflector is then attached to a molded plastic housing. The sheet, in this case, can be made thicker than the aluminized coating described above, without a reduction in reflectivity, and thus is less susceptible to burning and is more suited to thermally shielding its housing. However, because the reflector and its housing no longer form a unitary structure, the thickness of the aluminum sheet must be controlled precisely, and the housing should include reference mounting surfaces, retaining ribs and fingers, and the like, for accurately and securely mounting the reflector. U.S. Pat. No. 4,317,625 discloses some assembly requirements which should be met when a pre-shaped reflector is mechanically attached to a housing.

In summary, prior art light reflector apparatus and manufacturing methods therefor, are relatively complex and/or expensive. The present invention overcomes the disadvantages of the prior art.

SUMMARY OF THE INVENTION

According to the invention, a method of manufacturing light reflector apparatus provides for both precisely shaping a reflector and mounting the reflector securely within a housing in a single molding operation. This is accomplished generally by insert molding a flexible light-reflecting sheet into a plastic housing by an injection molding process.

In a preferred embodiment, the method of manufacturing light reflector apparatus comprises (i) locating a light-reflecting front surface of a flexible sheet in spaced relation to a forming surface, the contour of the forming surface being adapted to shape the sheet to reflect impinging light into a beam of illumination, (ii) enclosing the light-reflecting sheet in a fluid-receiving mold a portion of which is defined by the forming surface wherein at least portions of the light-reflecting sheet remain spaced from the forming surface, (iii) injecting liquid plastic into the mold under pressure against a rear surface of the sheet for applying compressive forces to the sheet to move the spaced portions of the light-reflecting front surface into intimate contact with the forming surface thereby shaping the sheet according to the shape of the forming surface in response to the plastic, and thereafter (iv) solidifying the plastic to form a hardened plastic housing supporting the sheet so as to maintain the contour of the sheet caused by the mold forming surface.

Also, new and improved light reflector apparatus, manufactured by the method according to the invention, is provided. The light reflector apparatus comprises a reflector having a light-reflecting front surface for reflecting light into a beam of illumination, and a unitary housing comprising a supporting body underlying a rear surface of the reflector, to retain its light-reflecting surface as formed by the mold forming surface.

The invention, and its advantages, will become more apparent in the detailed description of a method of manufacturing light reflector apparatus presented below.

DESCRIPTION OF THE DRAWINGS

In a detailed description of preferred embodiments of the invention presented below, reference is made to the accompanying drawings, in which.

DETAILED DESCRIPTION OF PREFERRED EMBODIMENTS

Because various uses of light reflector apparatus, i.e. automobile headlight, flashlight, searchlight, photographic flash apparatus including chemical flash and electronic strobe flash, etc., are well known, the present description will be directed to one particular type of light reflector apparatus, i.e. light reflector apparatus for a photographic flash device, and a method of manufacture, in accordance with the present invention. It is to be understood that light reflector apparatus, and manufacturing operations therefor, not specifically shown or described may take various forms well known to those having skill in the light reflector art.

Figure 1:
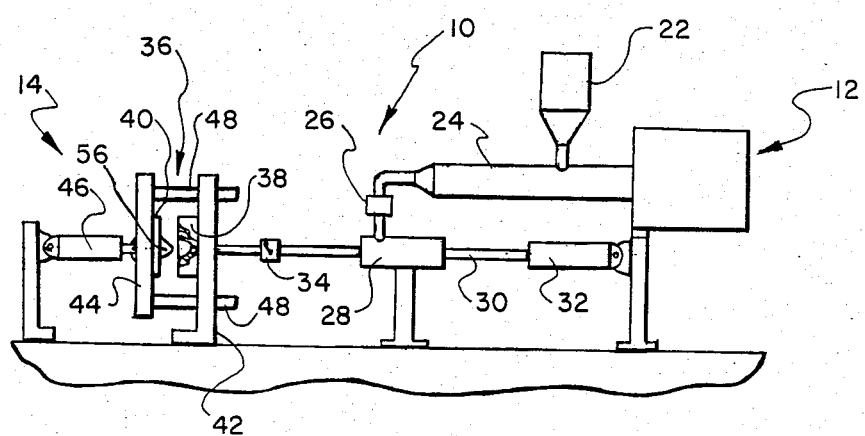
FIG. 1 is a plan view in schematic form of an injection molding machine for use in manufacturing light reflector apparatus according to the invention.

FIG. 1 schematically shows an injection molding machine 10, which is to be used in the manufacture of light reflector apparatus, according to the invention. Generally, equipment 10 includes an injection unit 12 and a clamping unit 14.

The injection unit 12 includes a hopper 22 in which pelletized plastic is loaded. The hopper 22 funnels the pelletized plastic into a heated extruder 24 wherein the plastic is converted to the liquid state. The extruder 24 feeds liquid plastic through a check valve 26 into a shooting pot 28, which contains an injection piston 30. The piston 30, under control of suitable motorized drive means 32, forces the liquid plastic through a shut-off nozzle 34 into the clamping unit 14.

The clamping unit 14 contains a mold 36 into which the liquid plastic is injected. The mold 36 comprises respectively female and male molding sections 38 and 40. The section 38, which is mounted on a stationary platen 42, is connected to the shut-off nozzle 34 for receiving liquid plastic from the injection unit 12.

The section 40 is mounted on a movable platen 44, which is driven by a piston 46 into a molding position. Rails 48 support and align the platens, to provide accurate mold alignment. The clamping unit 14 may also include an ejector (not shown) for removing the molded part from the mold 36 after the liquid plastic cools.

Injection molding machine 10 described above is conventional and is available from a variety of sources, one of which is Husky Injection Molding Systems Ltd, Bolton, Ontario, Canada.

In a preferred embodiment described below, light reflector apparatus is provided for an electronic strobe flash unit. The reflector apparatus includes a metallic reflector and a plastic housing supporting the reflector. The reflector apparatus is shaped as a trough-like chamber for reflecting light impinging on the reflector through the open end of the chamber. Preferably, the reflector is shaped so that the reflected light is concentrated into a beam. The reflector lines the inside of the chamber and, thus, also has a trough-like configuration. The side walls of the reflector, which define respective ends of the trough, are spaced for receiving an elongate flash tube therebetween in the base of the trough. The side walls also define a suitable opening through which respective ends of the flash tube can protrude.

The plastic housing is integrally molded to the reflector by an injection molding operation. The reflector is shaped into its trough-like configuration in response to the injecting of liquid plastic into a mold. The plastic is allowed to solidify to form the plastic housing, which maintains the contour of the reflector formed during the molding operation.

It will be obvious to those having skill in the art and from the disclosure that follows that any of a variety of shapes for light reflector apparatus can be formed using the teachings of the invention.

Figure 2:
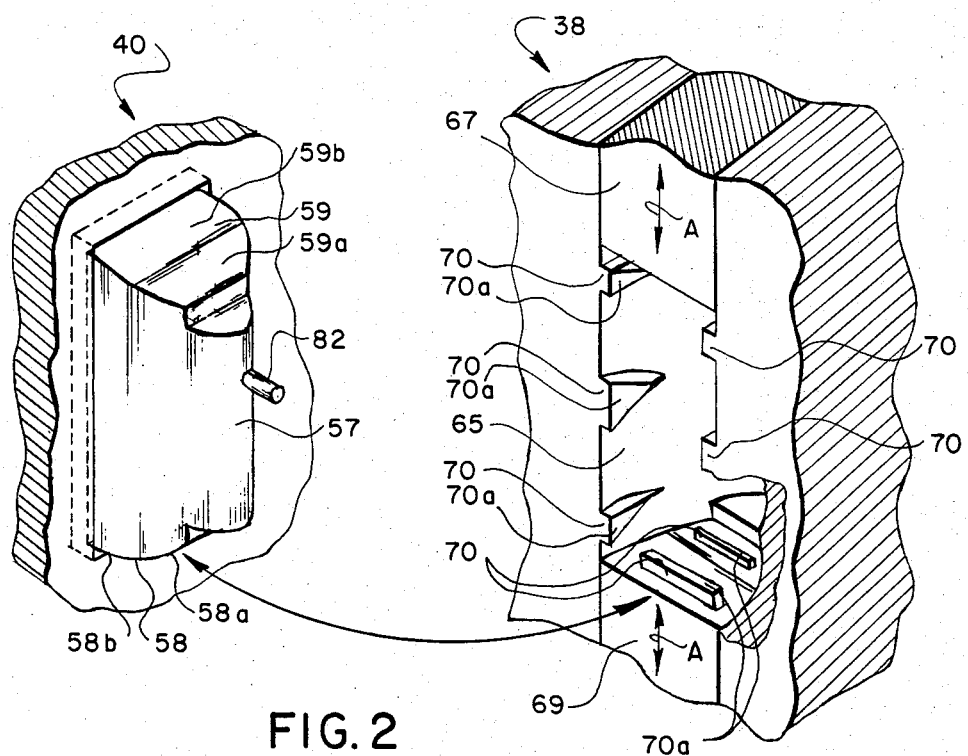
FIG. 2 is an exploded, perspective view of upper and lower molding sections of the injection molding machine of FIG. 1.

Referring now to FIG. 2, the female and male molding sections, 38 and 40, define respectively the rear and front surfaces of light reflector apparatus made according to the invention.

The male molding section 40, which serves to form a forwardly facing surface of the light reflector apparatus, includes a projecting mandrel 56 having a generally elliptically curved, centrally located front-forming surface 57, which forms the trough of the reflector apparatus, and a pair of opposed side-forming surfaces 58 and 59, which form side walls at corresponding ends of the trough.

Each side-forming surface is comprised of two corresponding planar sections 58a, 58b and 59a, 59b, respectively. The sections 58a, 58b and 59a, 59b serve to orient corresponding side walls of the reflector apparatus at an angle for reflecting light. For this purpose, the sections 58a and 59a are obtuse, and the sections 58b and 59b are approximately perpendicular to the longitudinal axis of the trough.

The female molding section 38, which forms a rearwardly facing housing surface of the light reflector apparatus, includes a fixed, centrally located portion 65, and a pair of opposed side draws 67 and 69, which are mounted to respective ends of the central portion 65, for relative movement in the direction of the arrows A, to enclose and open the female portion of the mold 36. The central portion 65 of the female molding section 38 corresponds to the front-forming surface 57 of the male section 40. Likewise, the side draws 67 and 69 of the female section 38 correspond respectively to the side-forming surfaces 59 and 58 of the male molding section 40.

The central portion 65, and the side draws 67 and 69 include a plurality of depending inwardly facing shut-offs or holddown pads 70. The pads 70 have clamping surfaces 70a, the contours of which are adapted to selectively clamp a light-reflecting flexible sheet (FIG. 3) about the mandrel 56 when the mold 36 is closed.

Figure 3:
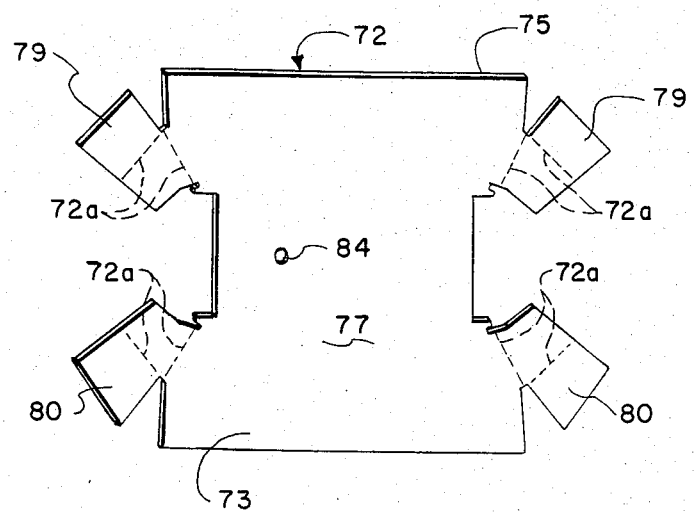
FIG. 3 illustrates a light-reflecting flexible sheet which is to be shaped into a reflector for light reflector apparatus.

Referring now to FIG. 3, there is shown a light-reflecting flexible sheet 72 which is to be shaped by the mandrel 56 into a reflector during an injection molding operation. Preferably, the sheet 72 is aluminum. In a photographic flash application, its front surface, denoted 73, is highly polished to a mirror-like finish for reflecting light. Its back surface, denoted 75, need not be specially treated. In the illustrative embodiment, the material 72 may have a thickness of about 0.33 millimeter.

The sheet 72 of FIG. 3 is cut from flat sheet stock so as to be shaped into the aforementioned trough-like configuration. Central portion 77 forms the trough of the reflector, and mating pairs of end flaps 79 and 80 form a reflector side wall, at each end of the trough. For a reason made apparent below, the material 72 is somewhat smaller than corresponding portions of the forming surfaces of the mandrel 56.

Figure 4:
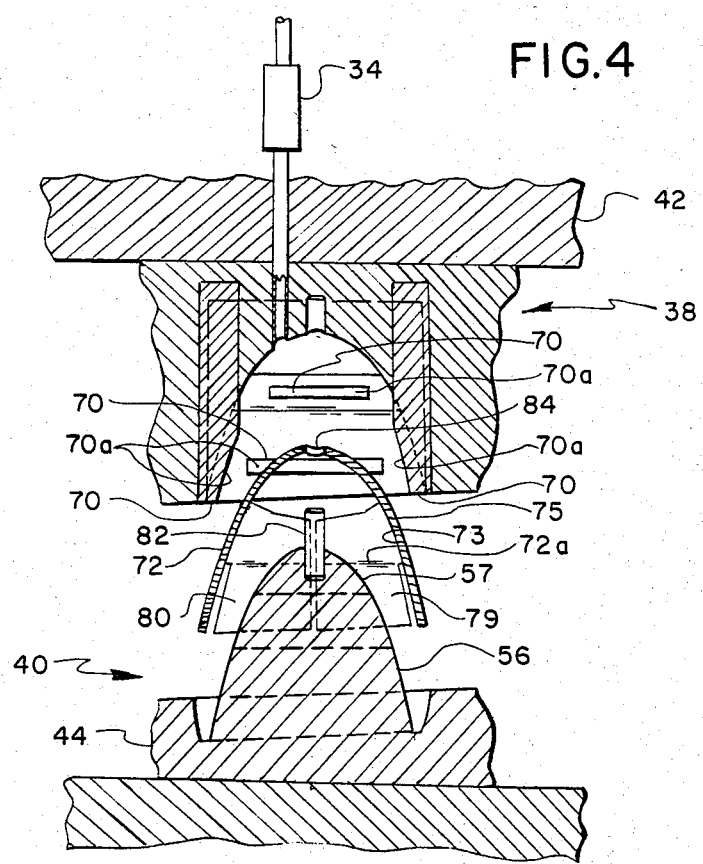
FIGS. 4 through 7 are cross-sectional views of the sheet of FIG. 3, and the upper and lower molding sections of FIG. 2, during various stages of an injection molding operation.

Considering now the present invention as regards the method of manufacturing flash reflector apparatus, reference is made to FIGS. 4 through 7 which are cross-sectional views of the mold 36 at various stages of manufacture. In manufacturing the flash reflector apparatus, the central portion 77 of the sheet 72 is first centered on the forming surface 57 of the mandrel 56. A pin 82 on the surface 57, and a receiving pinhole 84 in the sheet 72 can be used for centering the sheet 72 on the forming surface 57. The polished, light-reflecting surface 73 faces the mandrel 56, as shown in FIG. 4.

To assist in shaping the sheet 72 to the contour of the mandrel 56, we have found that it is beneficial to prefold the sheet 72 prior to positioning it on the mandrel 56. Prefolding is done manually or by automatic equipment (not shown) along bend lines, shown by the dashed lines 72a of FIG. 3. In the prefolding of the sheet 72, it is preferred that its polished surface 73 is slightly open, that is less concave, relative to the contour of the mandrel 56. This prevents scuffing or scratching of the surface 73 as the sheet 72 is brought into intimate contact with the mandrel 56.

Figure 5:
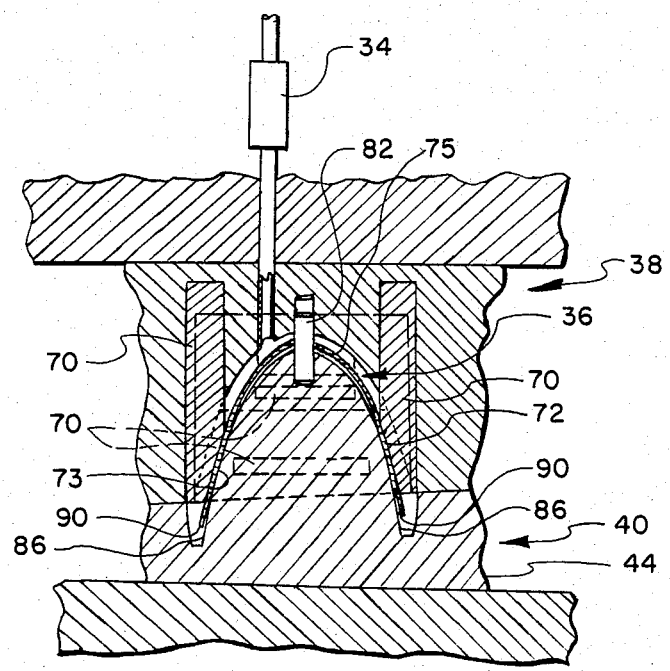

Next, as is shown in FIG. 5, the male molding section 40 is moved into its molding position, under the influence of the piston 46 (FIG. 1). The sheet 72 is enclosed in the mold 36, which constitutes a fluid-receiving chamber, a portion of which is defined by the contour of the mandrel 56. When the mold 36 is closed, the holddown pads 70 engage the back surface 75 of the sheet 72 and selectively clamp its polished surface 73 to corresponding areas on the front-forming surface 57 and the side forming surfaces 58 and 59 of the mandrel 56.

As is shown in FIG. 5, the sheet 72 is now shaped only according to the general contour of the mandrel 56. Unclamped areas of the sheet 72 may not be in intimate contact with the forming surface 57, as shown by the spaces between the sheet 72 and the forming surface 57 of the mandrel 56. FIG. 5 also illustrates that, because the sheet 72 is smaller than the mandrel 56, border or peripheral portions of the front-forming surface 57, and the side forming surfaces 58b and 59b of the mandrel 56, denoted 86, are not covered by the sheet 72.

After the mold 36 is closed, heated, liquid plastic, denoted 88 (FIGS. 6 and 7), is injected under pressure through the nozzle 34 into the female molding section 38 against the back surface 75 of the sheet 72. The plastic 88 spreads across the back surface 75 and lips around outer edges, denoted 90, of the sheet 72 against the uncovered peripheral portions 86 of the mandrel 56. Pressure relief means (not shown) are provided for removal of air trapped in the mold 36.

Figure 6:
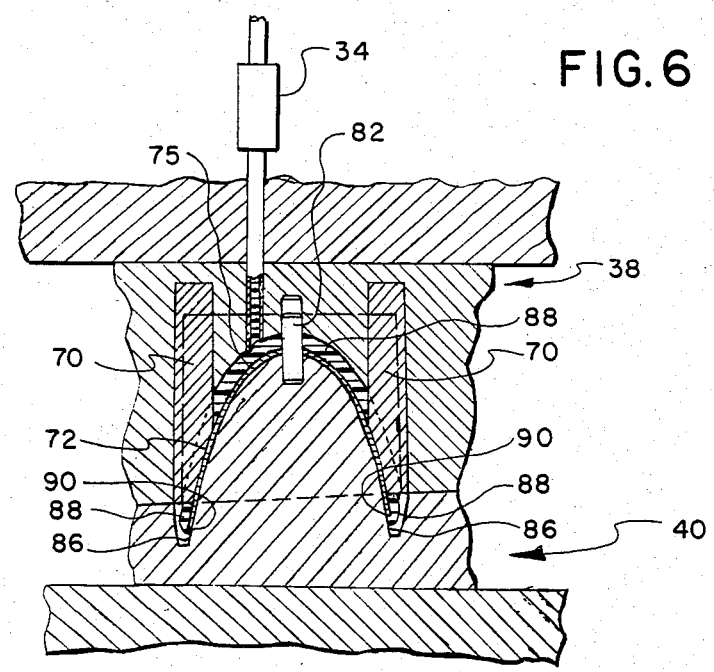
Figure 7:
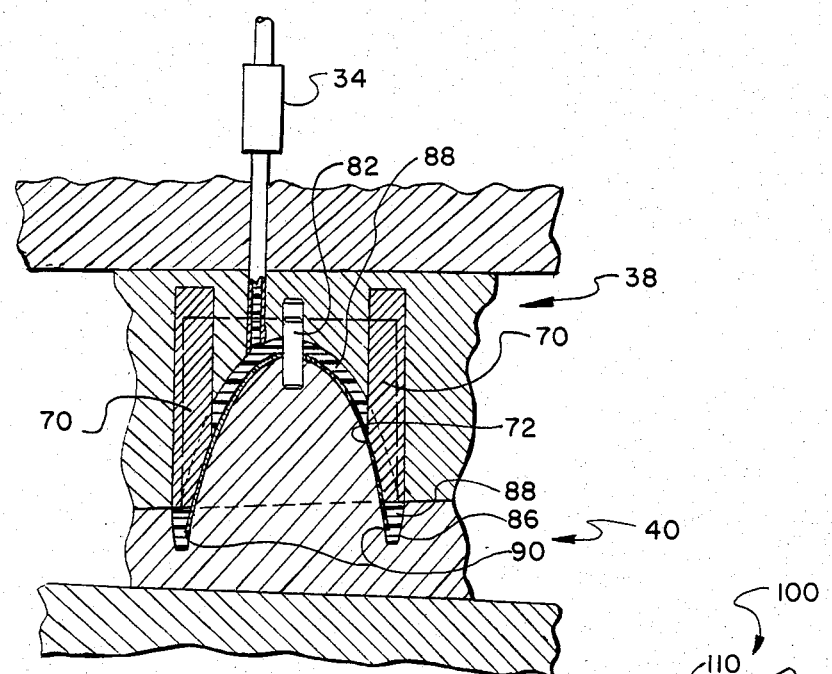

As the mold 36 fills with plastic 88, the sheet 72 is subjected to progressively increasing compressive forces. These forces move the light-reflecting surface 73 of the sheet 72 into intimate contact with the mandrel 56 thereby eliminating the aforementioned spaces between the sheet 72 and the forming surface 57, as shown in FIGS. 6 and 7. The intimate contact between the sheet 72 and the mandrel 56 shapes the light-reflecting surface 73 precisely according to the contour of the mandrel 56. Such contact also renders the boundary between the edges 90 of the sheet 72 and the mandrel 56 impervious to plastic. Thus, plastic is prevented from leaking between the mandrel 56 and the sheet 72 onto the light-reflecting surface 73. By selectively clamping the sheet 72 to the mandrel 56 prior to injecting the plastic 88 into the mold 36, flash reflector apparatus can be made having a wide variety of shapes wherein the light-reflecting surface 73 is free of plastic. FIG. 6 illustrates the mold 36 when it is partially filled with plastic 88, and FIG. 7 illustrates the mold 36 when it is completely filled with plastic.

Next, the plastic 88 is allowed to harden by cooling it. The plastic 88 is cooled quickly by passing water through the female molding section 38 by means not shown.

To open the mold 36, the male molding section 40 is withdrawn from the female section 38. The side draws 67 and 69 are then moved away from their respective ends of the central portion 65 to open the female portion of the mold 36.

Figures 8A, 8B, 9:
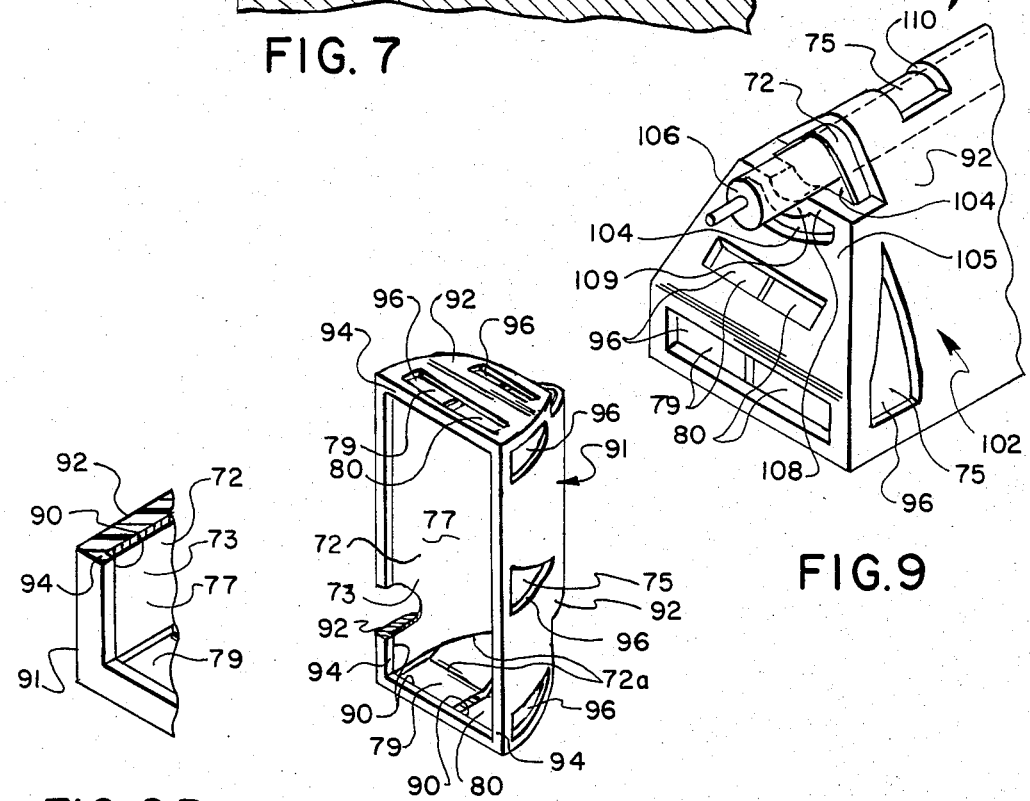
FIG. 8A is a perspective view, a portion of which is cut away, of trough-shaped light reflector apparatus manufactured in accordance with the invention.
FIG. 8B is an enlarged perspective view of the lower left-hand corner of the light reflector apparatus shown in FIG. 8A.
FIG. 9 is an end view of an alternative preferred embodiment of light reflector apparatus, manufactured in accordance with the invention, for an electronic flash unit.

FIGS. 8A and 8B illustrate the flash reflector apparatus after it is removed from the mold 36. The reflector apparatus is in the form of an open-ended chamber and comprises a reflector lining the open face of the chamber, and a hardened plastic housing 91 supporting the reflector. The reflector consists of the sheet 72, which is now shaped according to the contour of the mandrel 56. The housing 91 comprises a concave supporting body 92, underlying the back surface 75 of the sheet 72, and a lip or shoulder 94, integral with the body 92, and contiguous with and surrounding the outer edges 90 of the sheet 72. The shoulder 94 traps the sheet 72 against the underlying body 92, so that the sheet 72 is maintained in the shape caused by the contour of the mandrel 56 during the molding operation. The openings 96 in the supporting body 92 expose those areas of the back surface 75 of the sheet 72 which were clamped by the holddown pads 70 while the mold 36 is closed.

An electronic flash unit 100 having a light reflector apparatus 102 manufactured in accordance with the teachings of the invention is shown in FIG. 9. Elements of light reflector apparatus 102 similar to elements of light reflector apparatus of FIG. 8 are identified by like numerals. An opening 104 in the base of each flash side wall 105 adjacent the trough of the light reflector apparatus is for receiving a flash tube 106.

The tube 106 is supported at each end by an elastic, plastic arm 108. As viewed from the end of the light reflector apparatus, each arm 108 extends from one side of the reflector apparatus to the other side across a central portion of its corresponding opening 104, and is integrally attached at each end to a side wall 105. The arm 108, which includes a cradle-shaped central portion 109 for receiving the tube 106, resiliently biases the tube 106 against the light-reflecting surface 73 of the sheet 72. The arm 108 can accommodate variations in tube diameter, and assures centering of the tube 106 in the base of the trough. Each opening 104 and arm 108 are provided by respectively closing and opening corresponding portions of the mold 36 to plastic 88.

The underlying supporting body 92 includes an aperture 110 located to expose the back surface 75 of a portion of the sheet 72 adjacent the tube 106. The aperture 110 can be formed by clamping this area of the surface 75 by a holddown pad 70. The aperture 110 provides an area for electrically connecting the sheet 72 to the secondary winding of a flash tube trigger transformer (not shown) for applying a tube triggering voltage directly to the sheet 72. Thus, the sheet 72 serves both as a light reflector and as a tube trigger electrode. U.S. Pat. No. 3,484,597 discloses a reflector for an electronic flash unit that also serves as a tube trigger electrode.

Polycarbonate M39-6823, sold by the Mobay Chemical Company of Pittsburgh, Pennsylvania under the trademark Merlon, is a plastic ideally suited to this manufacturing operation. This polycarbonate, which is heated to about 290° C. and is pressurized at about 45 kilograms per square centimeter for the molding operation, has a high viscosity and, thus, a low flow rate. This is advantageous as it serves to further assure that the plastic is prevented from leaking between the polished surface 73 and the mandrel 56, as the plastic is injected into the mold 36. We have found that the location at which plastic 88 is injected into the mold 36 against the surface 75 is not particularly critical.

By using a coolant, the plastic is hardened sufficiently within less than 20 seconds to allow the mold 36 to be opened. Full curing of the plastic probably occurs within about 24 hours. Upon hardening, this polycarbonate has a high creep resistance and thus maintains the reflector in its desired shape.

A further advantage of this polycarbonate is that it is relatively clear. Thus, it more readily dissipates heat produced during flashing.

A still further advantage offered by its clarity is that this polycarbonate can be used for making a flash covering window (not shown). The mold 36 can be configured for making the window integral with the housing 91. Conveniently, the window is connected to the housing 91 by plastic hinges so as to be readily swung into a tube-covering position. A further feature is that flash diffusing means such as a fresnel lens or the like can be placed within the window-forming portion of the mold 36 so that the window can be molded around the lens.

The invention has been described in detail with particular reference to two preferred embodiments thereof, but it will be understood that variations and modifications can be effected within the spirit and scope of the invention.

We claim:

1. A method of making light reflector apparatus including a housing within which is located a reflector having a shape for reflecting light emanating from a source of illumination into a beam of illumination, said method comprising:
   (a) placing a front, light-reflecting surface of a flexible material in spaced relation to a forming surface, the contour of the forming surface being adapted to form the light-reflecting surface into a shape for reflecting light into a beam of illumination;
   (b) enclosing the material in a fluid-receiving molding chamber a portion of which is defined by the forming surface wherein at least portions of the flexible material remain spaced from the forming surface;
   (c) injecting liquid plastic into the chamber under pressure against a rear surface of the flexible material for applying compressive forces to the material to move the spaced portions of the light-reflecting surface into intimate contact with the forming surface, thereby shaping the material according to the contour of the forming surface in response to the plastic; and
   (d) solidifying the plastic to form a solid plastic housing underlying the rear surface of the flexible material for maintaining the shape of such material caused by the forming surface.

2. A method of making light reflector apparatus including a housing within which is located a reflector having a shape for reflecting light emanating from a source of illumination into a beam of illumination, said method comprising:
   (a) placing a light-reflecting front surface of a flexible metallic material in spaced relation to a forming surface so that the center of the light-reflecting surface is aligned with the center of the forming surface, the contour of the forming surface being adapted to form the light-reflecting surface into a shape for reflecting light into a beam of illumination, and the forming surface being larger than the flexible material;
   (b) enclosing the flexible material in a fluid-receiving molding chamber a portion of which is defined by the forming surface wherein at least portions of the flexible material remain spaced from the forming surface;
   (c) filling the chamber with liquid plastic by injecting the plastic into the chamber under pressure against a rear surface of the flexible material for moving the spaced portions of the light-reflecting surface into intimate contact against the forming surface in response to the plastic, thereby (1) shaping the flexible material according to the forming surface, and (2) rendering the boundary between edges of the flexible material and the forming surface impervious to plastic to prevent plastic from contacting the light-reflecting surface of the flexible material; and
   (d) allowing the plastic to solidify to form a solid plastic housing having a supporting body underlying the rear surface of the flexible material, and a shoulder, integral with the supporting body and enclosing edges of the flexible material, for confining the flexible material against the supporting body so that the shape of such material is maintained.

3. A method of making flash reflector apparatus including a support onto which is located a reflector having a shape for reflecting light emanating from a flash tube or bulb into a beam of illumination, said method comprising:
   (a) placing a front, light-reflecting surface of a flexible metallic material adjacent a forming surface, the contour of the forming surface being adapted to form the light-reflecting surface into a shape for reflecting light into a beam of illumination;
   (b) enclosing the flexible material in a fluid-receiving molding chamber having two opposed surfaces, one of which is defined by the forming surface and the other of which includes means for engaging a rear, opposed surface of the flexible material to selectively clamp portions of the light-reflecting surface to the forming surface;

(c) injecting liquid plastic into the chamber under pressure against the rear surface of the material for applying compressive forces to the material to move unclamped portions of the light reflecting surface into intimate contact with the forming surface to shape such material precisely according to the contour of the forming surface in response to the plastic; and (d) thereafter allowing the plastic to solidify to form a solid plastic housing underlying the rear surface of the flexible material for maintaining the shape of such material caused by the forming surface.

4. A method of making light reflector apparatus including a support onto which is located a reflector having a shape for reflecting light emanating from a flash tube or bulb into a beam of illumination, said method comprising:

(a) positioning a front, light-reflecting surface of a metallic material adjacent a forming surface so that the center of the light-reflecting surface is aligned with the center of the forming surface, the contour of the forming surface being adapted to form the light-reflecting surface into a shape for reflecting light into a beam of illumination, and the magnitude of the forming surface being larger than the magnitude of the flexible material;

(b) enclosing the metallic material in a fluid-receiving molding chamber having two opposed surfaces, one of which is defined by the forming surface and the other of which includes means for engaging a rear, opposed surface of the metallic material to selectively clamp portions of the light reflecting surface to the forming surface;

(c) filling the chamber with heated, liquid plastic by injecting the plastic into the chamber under pressure against the rear surface of the metallic material for moving unclamped portions of the light-reflecting surface into intimate contact against the forming surface in response to the plastic, thereby (1) shaping the flexible material precisely according to the forming surface, and (2) rendering the boundary between peripheral edges of the metallic material and the forming surface impervious to plastic to prevent plastic from contacting the light-reflecting surface; and (d) thereafter allowing the plastic to solidify to form a solid plastic housing having a supporting body underlying the rear surface of the metallic material, and a shoulder, integral with the supporting body and enclosing peripheral edges of the metallic material, for confining the metallic material against the supporting body so that the shape of such material caused by the forming surface is maintained.

5. Light reflector apparatus for reflecting light emanating from a source of illumination into a beam of illumination, manufactured by a method as claimed in claim 1, comprising:

(a) a flexible material having a reflective surface formed to reflect light into a beam of illumination; and (b) a plastic housing in intimate contact with an opposing surface of said flexible material and supporting said flexible material to retain it as formed.

6. Light reflector apparatus for reflecting light emanating from a flash tube or a light bulb into a beam of illumination, manufactured by a method as claimed in claim 4, comprising:

(a) a planar flexible metallic material having a front reflective surface formed to reflect light into a beam of illumination; and (b) a plastic housing including (i) a supporting body in intimate contact with a rear surface of said flexible material for supporting said flexible material, and (ii) a shoulder integral with said supporting body and contiguous with edges of said flexible material for retaining said material in intimate contact with said supporting body.

* * * * *